US012800019B2

(12) United States Patent
Angel et al.

(10) Patent No.: US 12,800,019 B2
(45) Date of Patent: Nov. 17, 2026

(54) MODULAR ELECTRIC AXLE ASSEMBLY FOR BANJO HOUSING

(71) Applicant: Schaeffler Technologies AG & Co. KG, Herzogenaurach (DE)

(72) Inventors: Scott Angel, Marshallville, OH (US); Gregory Heeke, Wooster, OH (US); Patrick Lindemann, Wooster, OH (US); Nicholas Crane, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 234 days.

(21) Appl. No.: 18/543,250

(22) Filed: Dec. 18, 2023

(65) Prior Publication Data

US 2024/0255049 A1 Aug. 1, 2024

Related U.S. Application Data

(60) Provisional application No. 63/451,660, filed on Mar. 13, 2023, provisional application No. 63/441,654, filed on Jan. 27, 2023.

(51) Int. Cl.

| | |
|---|---|
| ***F16H 57/03*** | (2012.01) |
| ***B60K 1/00*** | (2006.01) |
| ***B60K 17/04*** | (2006.01) |
| ***B62D 65/02*** | (2006.01) |
| ***F16H 57/029*** | (2012.01) |

(Continued)

(52) U.S. Cl.

CPC ............... *F16H 57/03* (2013.01); *B60K 1/00* (2013.01); *B60K 17/043* (2013.01); *B62D 65/02* (2013.01); *F16H 57/029* (2013.01); *F16H 57/031* (2013.01); *B60K 2001/001* (2013.01); *F16H 2057/02026* (2013.01); *F16H 2057/02034* (2013.01); *F16H 2057/02052* (2013.01)

(58) Field of Classification Search

CPC . F16H 57/03; F16H 57/031; B60K 2001/001; B60K 17/043

See application file for complete search history.

(56) References Cited

U.S. PATENT DOCUMENTS

| | | | | |
|---|---|---|---|---|
| 1,283,143 A | | 10/1918 | Fries | |
| 5,271,294 A | * | 12/1993 | Osenbaugh ............ | B60K 17/16 74/606 R |
| 6,609,649 B1 | | 8/2003 | Barnholt et al. | |

(Continued)

FOREIGN PATENT DOCUMENTS

| | | |
|---|---|---|
| JP | S59164459 A | 9/1984 |
| JP | 2008224035 A | 9/2008 |

(Continued)

*Primary Examiner* — Jeffrey J Restifo

(74) *Attorney, Agent, or Firm* — Volpe Koenig

(57) ABSTRACT

An electric axle assembly that includes an electric drive unit mounted in a banjo-style axle housing. The electric drive unit includes a motor, gear box, and differential within a housing. The electric drive unit is inserted into the banjo-style axle housing from a first side of the banjo-style axle housing such that at least a portion of the housing of the electric drive unit is contained within the banjo-style axle housing. Fasteners are installed from a second side of the banjo-style axle housing opposite the first side for securing the housing of the electric drive unit to the banjo-style axle housing.

16 Claims, 15 Drawing Sheets

(51) Int. Cl.

| | |
|---|---|
| ***F16H 57/031*** | (2012.01) |
| *F16H 57/02* | (2012.01) |

(56) References Cited

U.S. PATENT DOCUMENTS

| | | | | |
|---|---|---|---|---|
| 6,729,207 | B2 * | 5/2004 | Allmandinger | F16H 57/03 74/607 |
| 7,137,183 | B2 * | 11/2006 | Stuart | B60K 17/16 29/434 |
| 8,776,374 | B2 * | 7/2014 | Johnston | B23P 15/00 29/33 B |
| 9,103,427 | B2 * | 8/2015 | Downs | F16H 48/40 |
| 9,517,658 | B2 * | 12/2016 | Chung | F16H 48/42 |
| 9,746,069 | B2 * | 8/2017 | Gerstenberger | F16H 57/0483 |
| 10,179,478 | B2 * | 1/2019 | Bauer | B60B 35/166 |
| 11,002,352 | B2 * | 5/2021 | Ghatti | F16H 37/04 |
| 11,065,949 | B2 * | 7/2021 | Ziech | B60K 17/165 |
| 11,225,107 | B1 * | 1/2022 | Peck | B60B 35/14 |
| 11,247,548 | B2 * | 2/2022 | Devreese | B60K 17/346 |
| 11,247,556 | B2 * | 2/2022 | Kucharski | B60K 17/046 |
| 11,338,660 | B2 * | 5/2022 | Laforce | B60K 1/00 |
| 11,750,063 | B2 * | 9/2023 | Umerley | F16H 57/0441 180/65.1 |
| 11,840,115 | B2 * | 12/2023 | Ogawa | B21D 53/90 |
| 12,391,069 | B2 * | 8/2025 | Waltz | B60K 17/165 |
| 12,454,151 | B1 * | 10/2025 | Bahena | F16H 57/037 |
| 12,523,289 | B2 * | 1/2026 | Salgado | F16H 57/0427 |
| 12,583,300 | B2 * | 3/2026 | Wood | B60K 1/00 |
| 2007/0032121 | A1 | 2/2007 | Kamps et al. | |
| 2011/0082001 | A1 | 4/2011 | Beutler et al. | |
| 2014/0175757 | A1 | 6/2014 | Luchs et al. | |
| 2015/0087461 | A1 * | 3/2015 | Jackson | F16H 48/38 475/160 |
| 2018/0297401 | A1 | 10/2018 | Liu et al. | |
| 2019/0315216 | A1 | 10/2019 | Ziech | |
| 2020/0173535 | A1 | 6/2020 | Peng et al. | |
| 2021/0227712 | A1 | 7/2021 | Goehl et al. | |
| 2024/0255049 | A1 * | 8/2024 | Angel | F16H 57/03 |
| 2025/0010697 | A1 * | 1/2025 | Wood | B60K 1/00 |
| 2025/0303795 | A1 * | 10/2025 | Waltz | F16H 57/037 |
| 2026/0016079 | A1 * | 1/2026 | Hayakawa | F16H 57/0419 |

FOREIGN PATENT DOCUMENTS

| | | | |
|---|---|---|---|
| WO | 2018197473 | A1 | 11/2018 |
| WO | 2023287334 | A1 | 1/2023 |

* cited by examiner

MODULAR ELECTRIC AXLE ASSEMBLY FOR BANJO HOUSING

CROSS REFERENCE TO RELATED APPLICATIONS

This application claims the benefit of U.S. Provisional Application 63/441,654, filed Jan. 27, 2023 and U.S. Provisional Application 63/451,660, filed Mar. 13, 2023, both of which are incorporated by reference as if fully set forth.

TECHNICAL FIELD

The present disclosure relates generally to an electric axle, and more specifically to a housing of an electric axle assembly.

BACKGROUND

In general, electric axles are known structures used in motor vehicles. Electric axles include a number of components and are intended for the smallest vehicle installation spaces. It is desirable for electric axles to utilize light materials in order to remain efficient.

SUMMARY

Embodiments according to this disclosure provide for an electric axle assembly including a banjo axle housing and an electric drive unit. In one example, the banjo axle housing comprises an upper member and a lower member fixed to the upper member, and the upper and lower members are formed of a stamped construction. The electric drive unit has a housing, wherein the electric drive unit is mounted within the banjo axle housing and connected thereto. In embodiments, a stiffening plate is fixed to a rear side of the banjo axle housing, and the portion of the housing of the electric drive unit is secured to the banjo axle housing and stiffening plate via a bolted connection.

In accordance with one aspect of the present disclosure, an electric axle assembly comprises a banjo-type axle housing including an upper member, a lower member fixed to the upper member, and an electric drive unit having a housing. The electric drive unit is mounted within the banjo axle housing and connected thereto.

The banjo-type axle housing can include a central portion defining a hollow interior configured to receive a portion of the housing of the electric drive unit and two beam portions extending axially away from the central portion on opposite sides. The central portion can include a front wall on a first side thereof, the front wall can define a carrier opening extending to the hollow interior of the central portion, and a back wall on a second side opposite the first side, at least a portion of the housing of the electric drive unit can extend through the carrier opening and can be received in the hollow interior of the central portion of the banjo-type axle housing. A stiffening plate can be fixed to the back wall of the central portion of the banjo-type axle housing, and the electric drive unit can be secured to the banjo-type axle housing and stiffening plate via a bolted connection. The bolted connection can include a plurality of bolts inserted through the back wall from the second side of the central portion and received in corresponding holes of the housing of the electric drive unit. A stiffening ring can be interposed between the front wall of the central portion and the housing of the electric drive unit. The housing of the electric drive unit can include an opening and a cover plate enclosing the opening. The cover plate can include a sealing flange adapted to be telescopically received in the opening of the housing, the sealing flange can support a sealing element for sealing against an internal surface of the housing. The sealing element can include an O-ring supported in a groove in the sealing flange and/or an overmolded seal on at least the sealing flange. The cover plate can include a peripheral mounting flange including a plurality of openings, and the plurality of bolts can extend through the openings in the peripheral mounting flange of the cover plate. The mounting flange can be perpendicular to, and extend outwardly from, the sealing flange. The cover plate can be press-fit into the opening of the housing. The upper and lower members can be of a stamped construction.

In accordance with another aspect, a method of assembling an electric axle assembly comprises providing a banjo-type axle housing having an opening on a first side and a hollow interior, providing an electric drive unit having a housing, inserting the electric drive unit through the opening so at least a portion of the housing is received in the hollow interior of the banjo-type axle housing, and securing the housing of the electric drive unit within the banjo-type axle housing with at least one fastener installed from a second side of the banjo-type housing opposite the first side.

Securing the housing of the electric drive unit within the banjo-type housing can include inserting a plurality of bolts through a rear wall of the banjo-type housing into threaded bores in the housing of the electric drive unit, and tightening the plurality of bolts.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
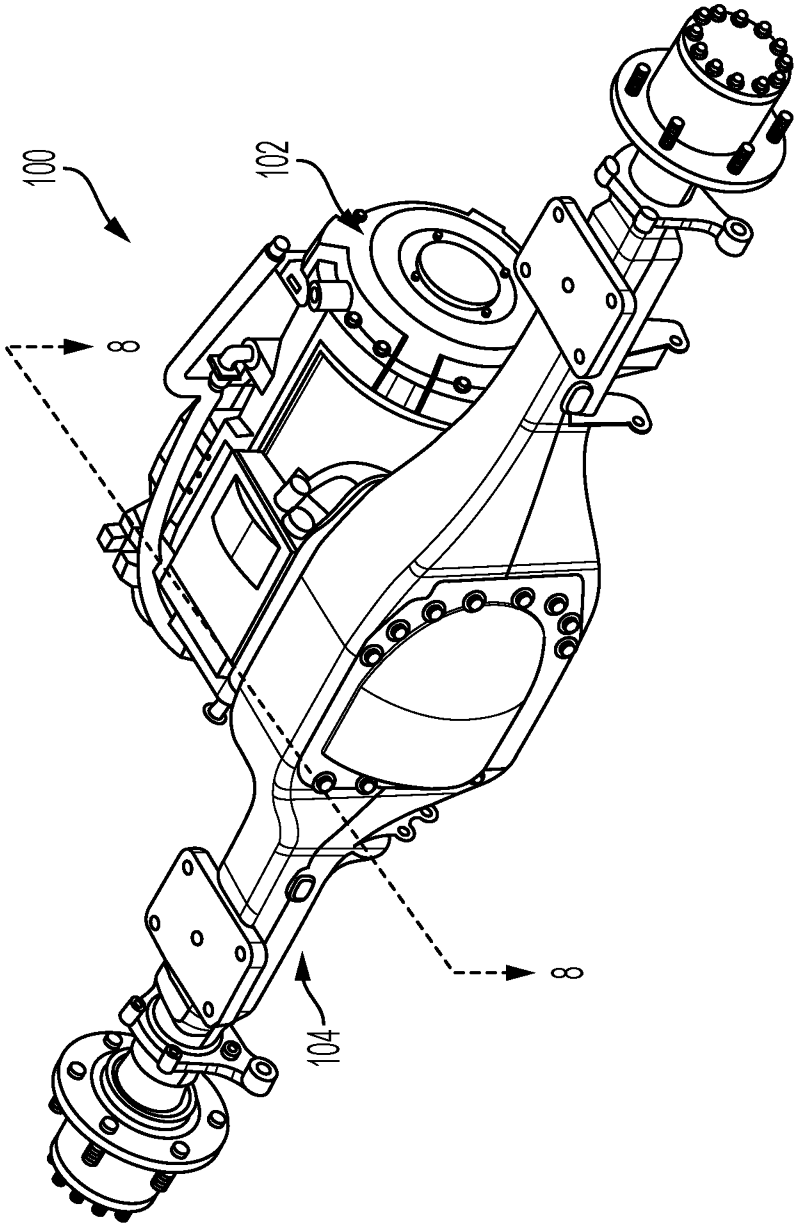
FIG. 1 is a rear perspective view of an exemplary electric axle assembly including a banjo axle housing and an electric drive unit in accordance with the present disclosure.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Embodiments according to this disclosure provide an electric axle assembly that includes an electric motor, gear box, and differential within an aluminum housing that is then suspended or mounted within a stamped steel banjo axle. It is mounted and assembled in a way that is modular and easy to service.

Figure 2:
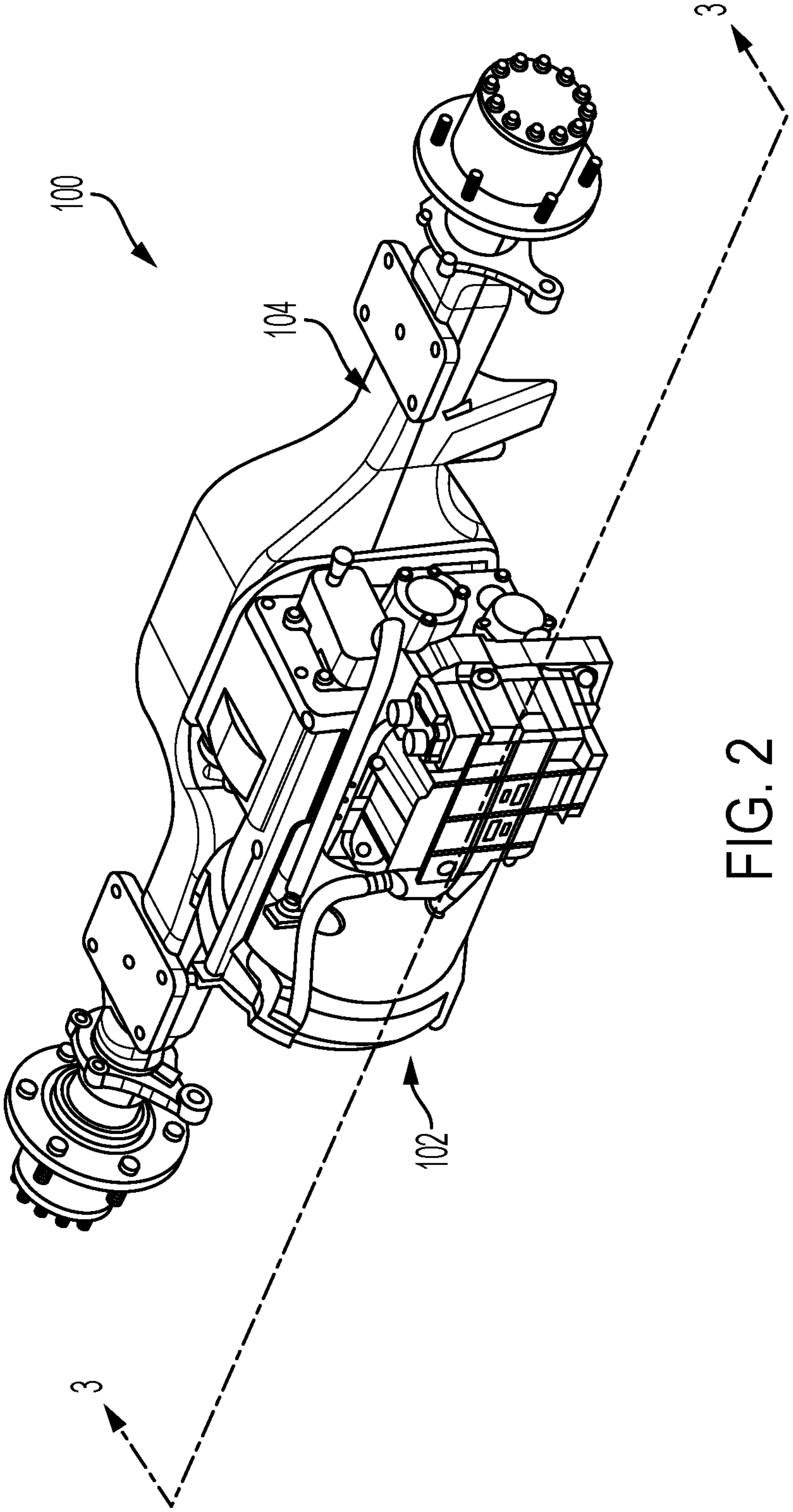
FIG. 2 is a front perspective view of the electric axle assembly in of FIG. 1.
Figure 3:
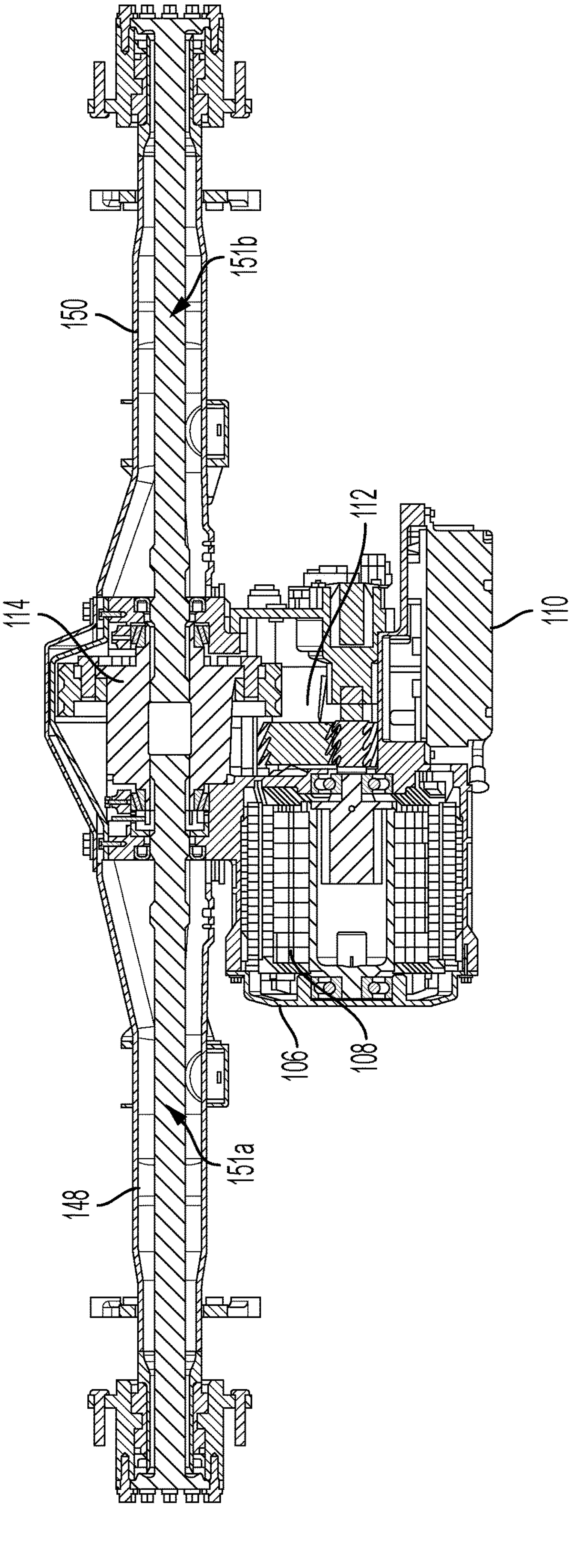
FIG. 3 is a cross-sectional view of the electric axle assembly of FIG. 1 taken along the line 3-3 in FIG. 2.

Referring to FIGS. 1-9, and initially to FIGS. 1-3, an electric axle assembly 100 includes an electric drive unit 102 mounted or suspended at least partially within an axle housing 104, which may be a banjo-axle design. As will be described in detail below, the electric drive unit 102 includes portions thereof that are telescopically received into portions of the axle housing 104. That is, portions of the electric drive unit 102 are nested within the axle housing 104 and secured and/or supported by the axle housing 104. Accordingly, the electric drive unit 102 can be assembled and/or disassembled as a unit with the axle housing 104 to form the electric axle 100.

Figure 4:
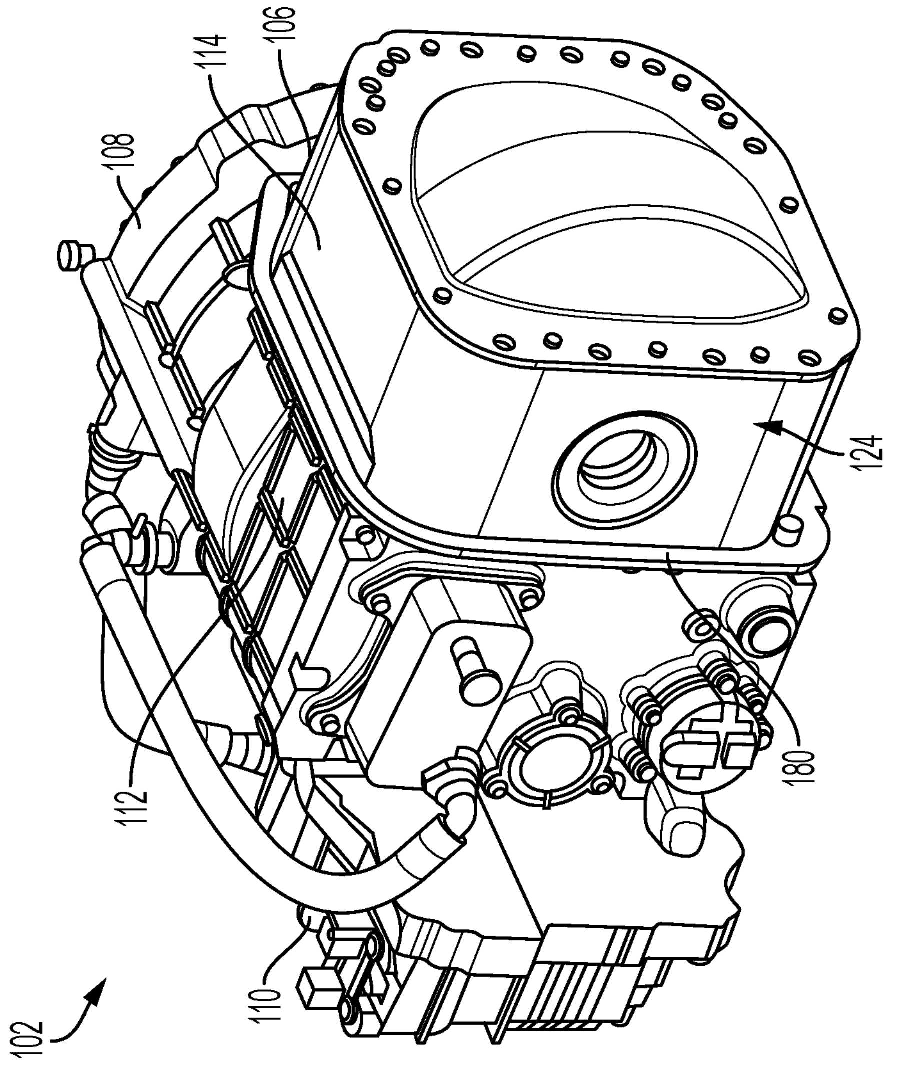
FIG. 4 is rear perspective view of the electric drive unit of FIG. 1.
Figure 5:
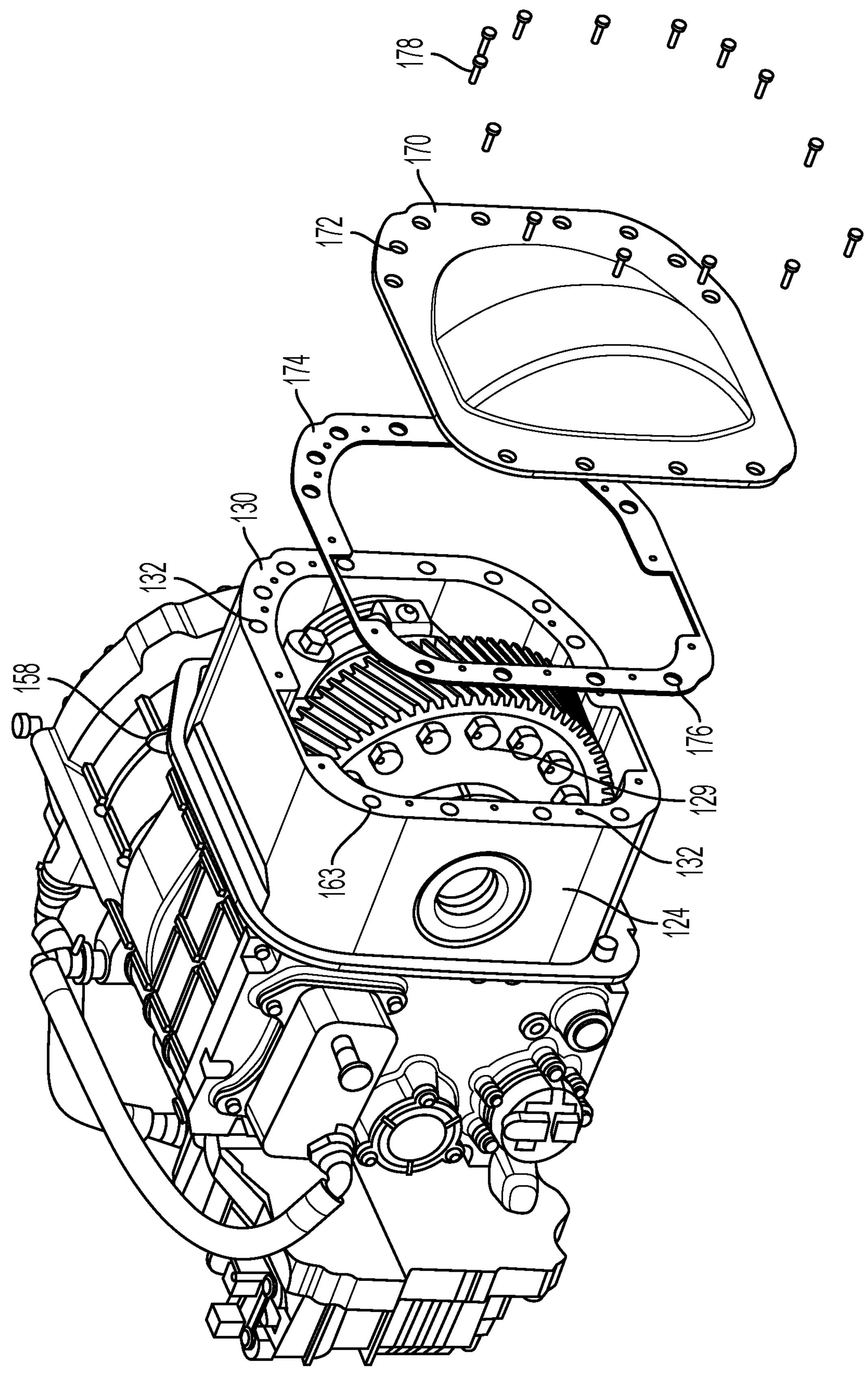
FIG. 5 is rear perspective partially exploded view of the electric drive unit of FIG. 4.

Turning to FIGS. 4 and 5, the electric drive unit 102 includes a housing 106, an electric motor 108, a power electronics unit (PEU) 110, a gearbox 112, and a differential 114. The housing 106 can be formed of aluminum and the axle housing 104 can be formed of steel and of stamped construction, for example.

Figure 6:
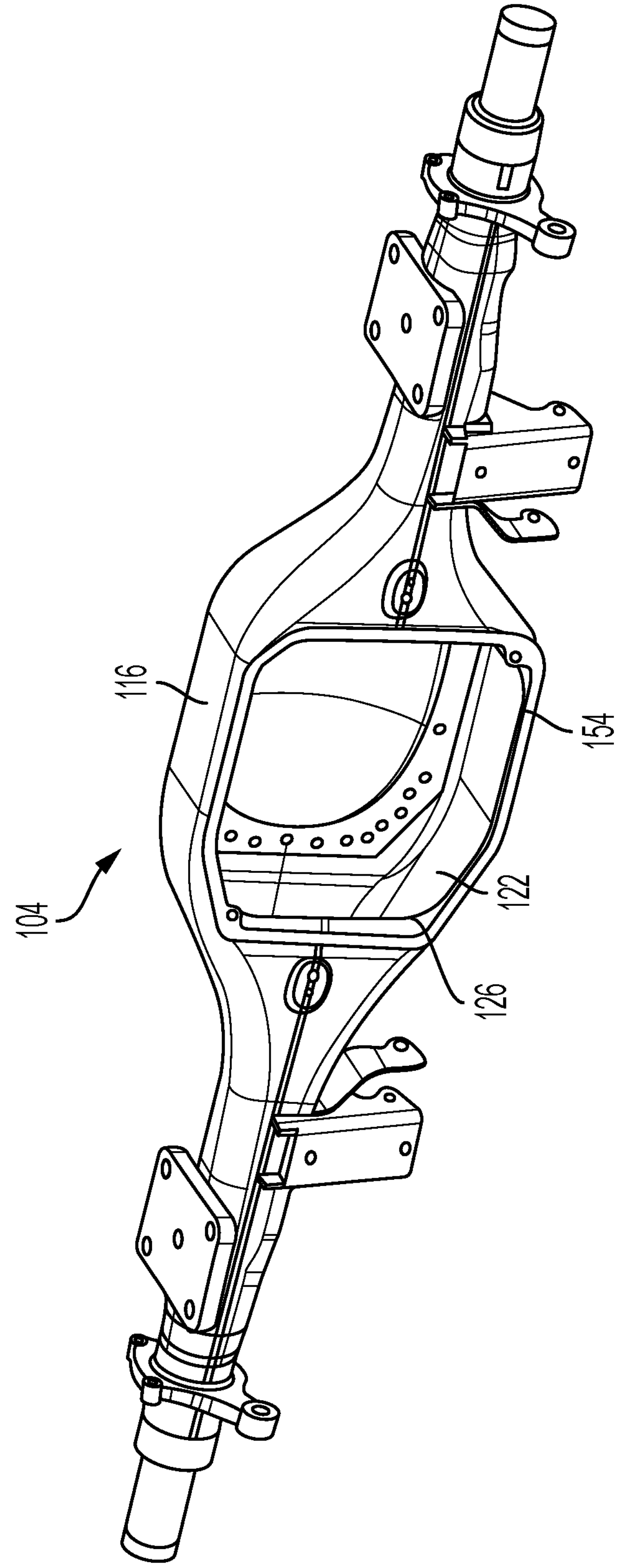
FIG. 6 is a front perspective view of the banjo axle of FIG. 1.
Figure 7:
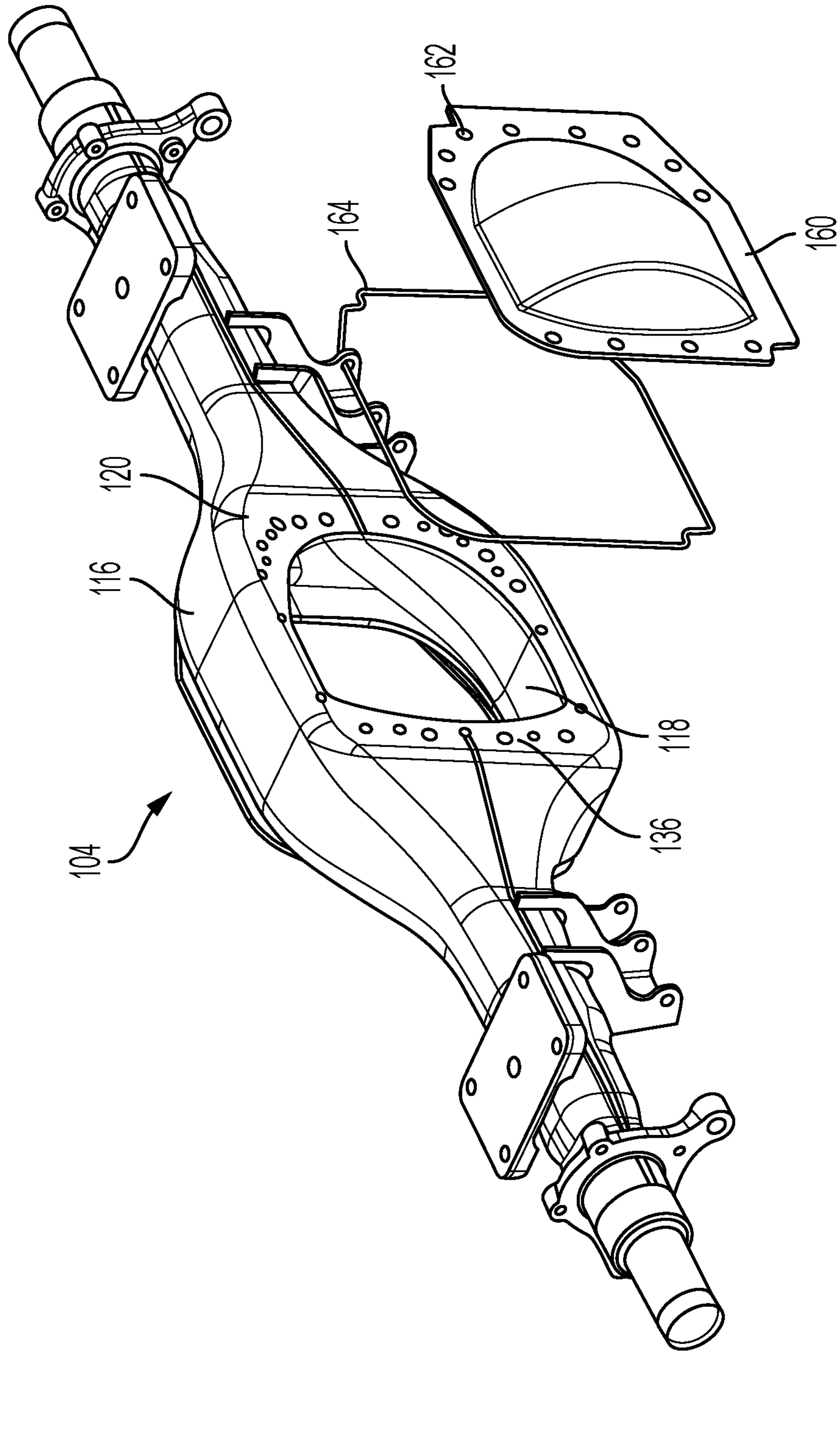
FIG. 7 is a rear perspective partially exploded view of the banjo axle of FIG. 1.

As best shown in FIGS. 6 and 7, the axle housing 104 includes an enlarged central, or banjo, portion 116 defining a hollow interior 118 configured for receiving a portion of electric drive unit 102 therewithin. The central portion 116 further includes back wall 120 arranged on a rearwardly facing side and a front carrier opening 122 formed therethrough on a forwardly facing side, wherein a portion 124 of the housing 106 is received through front carrier opening 122 bounded by front carrier wall 126 and abuts back wall 120 when assembled with the axle housing 104.

Figure 8:
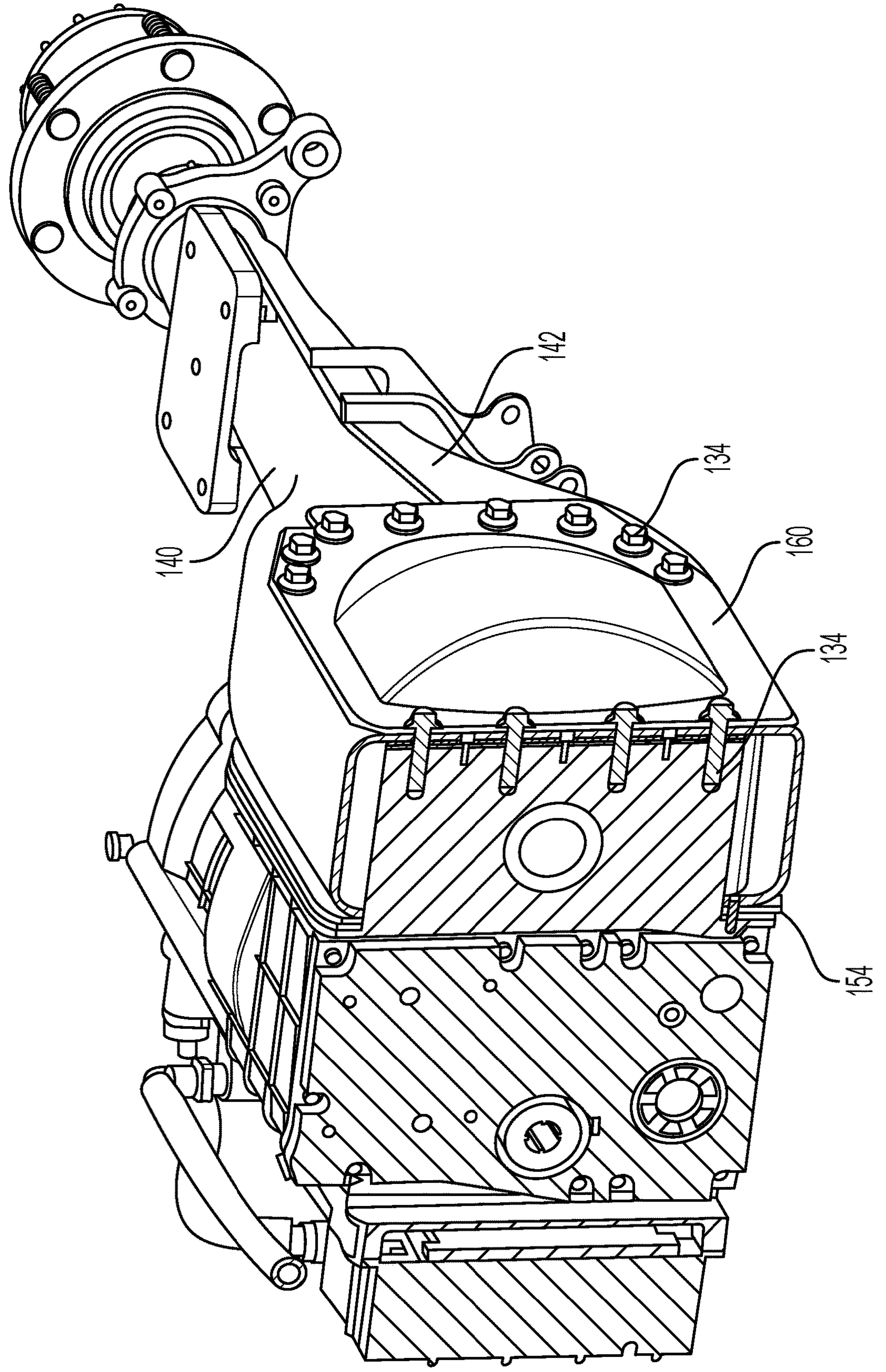
FIG. 8 is a perspective cross-sectional view of the electric axle assembly taken along the line 8-8 in FIG. 1.
Figure 9:
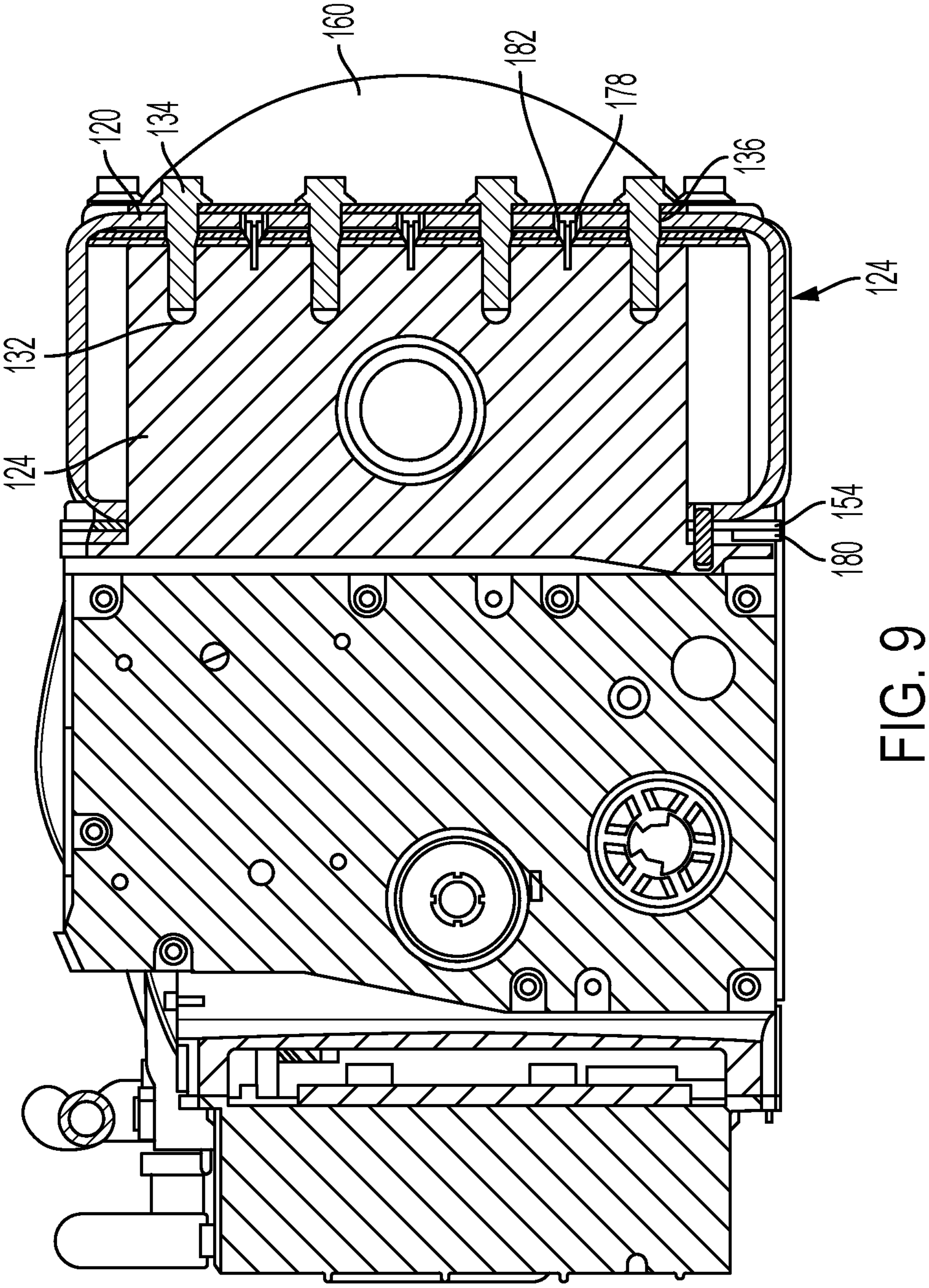
FIG. 9 is a cross-sectional view of the electric axle assembly taken along the line 8-8 in FIG. 1.

With additional reference to FIGS. 8 and 9, at least a portion of the housing 106 of the electric drive unit 102 is received within the axle housing 104 and secured to a back surface thereof. For example, portion 124 of the housing 106, which houses differential components 129 of the electric drive unit 102, may include a side wall 130 having a plurality of first openings 132 (e.g., threaded bores) configured to receive bolts 134 to secure the electric drive unit 102 to the axle housing 104 and, in particular, back wall 120 and holes 136 formed therein. In this way, electric drive unit 102 may be secured within banjo housing 104 via a bolted connection.

Figure 10:
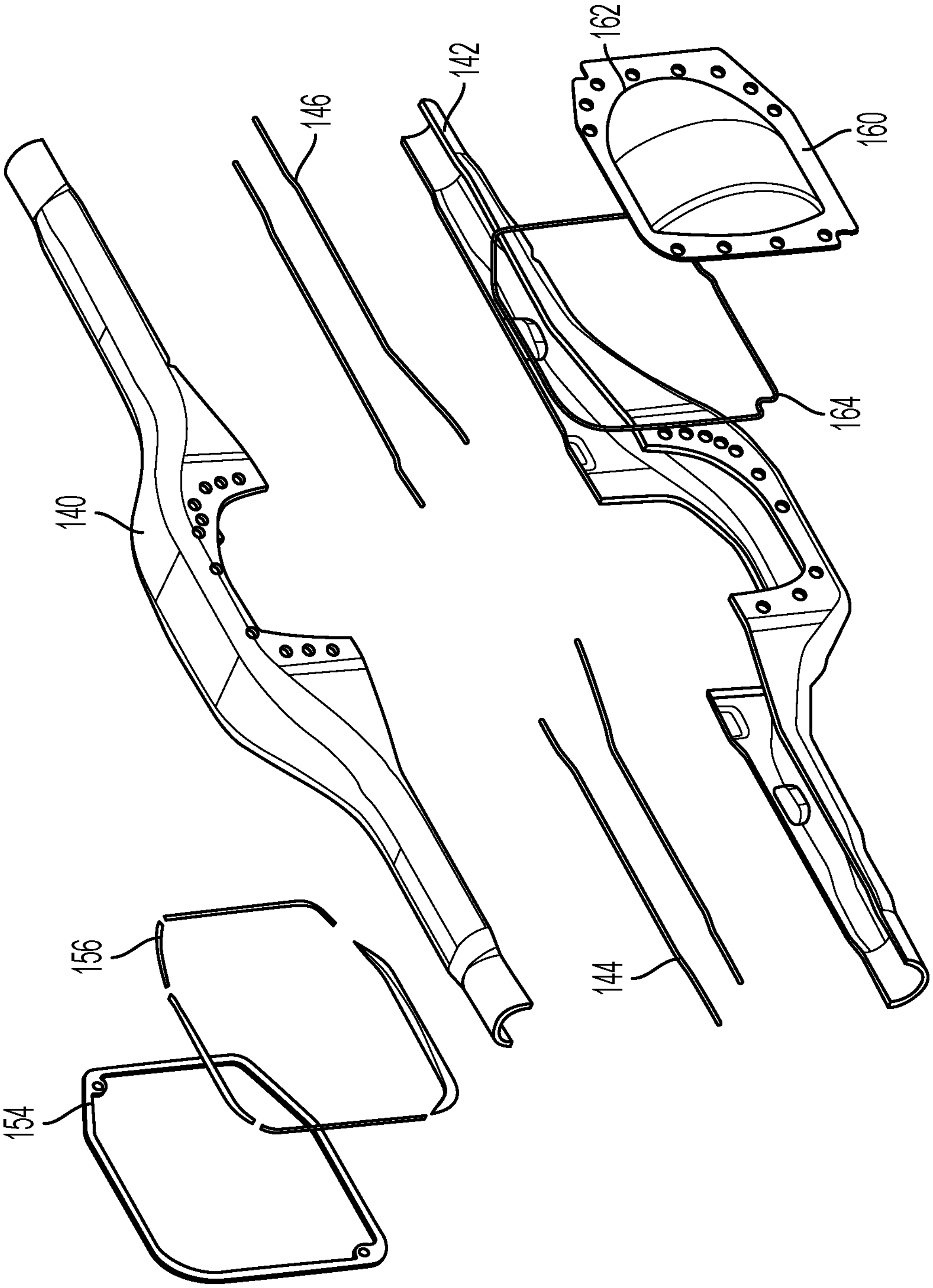
FIG. 10 is an exploded rear perspective view of the banjo axle housing of FIG. 1.
Figure 11:
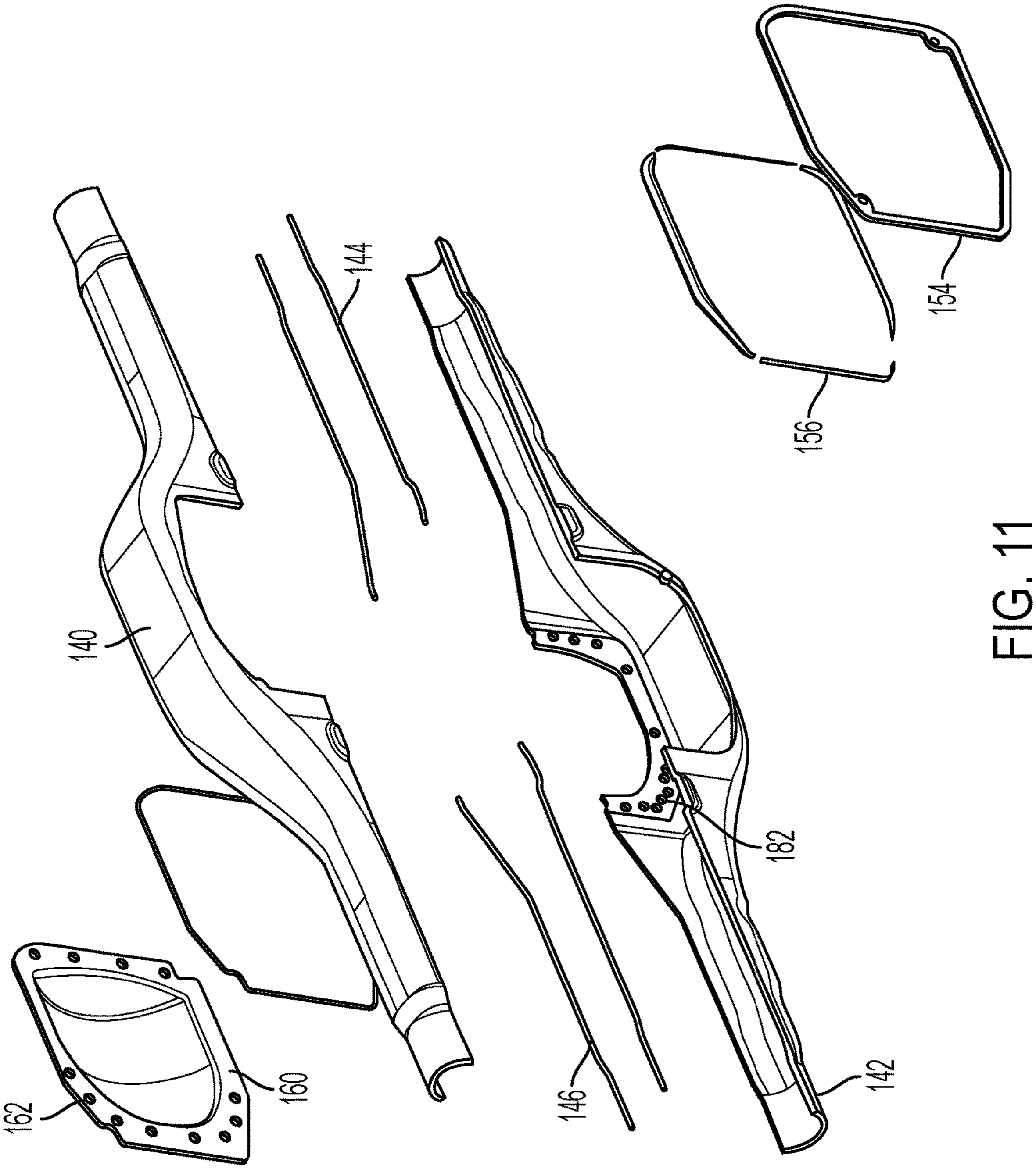
FIG. 11 is an exploded front perspective view of the banjo axle housing of FIG. 1.

Turning to FIG. 10, the axle housing 104 may be formed of a stamped construction and comprises an upper half member, or section, 140 and a lower half member, or section, 142 fixed together along their abutting adjacent side wall edges. The upper and lower half members 140, 142 can be fixed together via welds 144, 146 and together form, when assembled, a substantially rectangular cross-section in tube portions 148, 150 and central portion 116 (see FIG. 3). First tube, or beam, portion 148 and second tube, or beam, portion 150 extend axially outwardly from opposite sides of central portion 116 for housing respective axle shafts 151*a* and 151*b*. To assemble, portion 124 of housing 106 of electric drive unit 102 is assembled or inserted through front carrier opening 122, received in hollow interior 118, and is secured via bolts 134.

The axle housing 104 may further include stiffening ring 154 fixed to front carrier wall 126, for example, via weld 156. Stiffening ring 154 provides additional stiffness around front carrier opening 122. A top surface of stiffening ring 154 may then be machined flat to maintain a constant contact with housing 102 and, in particular, flange 158 when assembled. The axle housing 104 may further include a back cover or stiffening plate 160 that is configured to be secured to back wall 120 of the housing 104 and side wall 130 of housing 106 via bolts 134. That is, bolts 134 may be inserted through openings 162 of back cover 160, through openings 136 formed in back wall 120 of banjo housing 104 to be received in a plurality of second openings 163 (e.g., threaded bores) formed in side wall 130 of housing 106. Back cover or stiffening plate 160 may further be fixed to banjo housing 104 via weld 164. Back cover 160 is configured to act as a stiffening plate and encloses hollow interior 118 to prevent leakage from the assembly. Back cover or stiffening plate 160 may be formed by a stamped construction, for example.

In some embodiments, the housing 106 may further include a rear opening and a cover plate 170 secured to the housing 106 and closing/sealing off the internal components (e.g., differential) from an exterior of the housing 106. The cover plate 170 includes openings 172 formed therein. A flange 174 having openings 176 formed therein may be disposed between the side wall 130 and the cover plate 170 and configured to act as a sealing mechanism therebetween. The cover plate 170 may be secured to the housing 106 via bolts 178. That is, bolts 178 may be inserted through openings 172 of cover plate 170, through openings 176 of flange 174 to be received within first openings 132 formed in side wall 130 of housing 102. Back wall 120 of banjo housing 104 may further include recessed portions 182 for clearance of bolt heads of bolts 178. Cover plate 170 may be formed of a stamped construction, for example. Housing 106 may further include sealing element 180 disposed between flange 158 and stiffening ring 154 for preventing contamination from getting inside banjo housing 104. In some embodiments, sealing element may be made of porous material such as foam or rubber and may be configured to be axially deformable.

Figure 12:
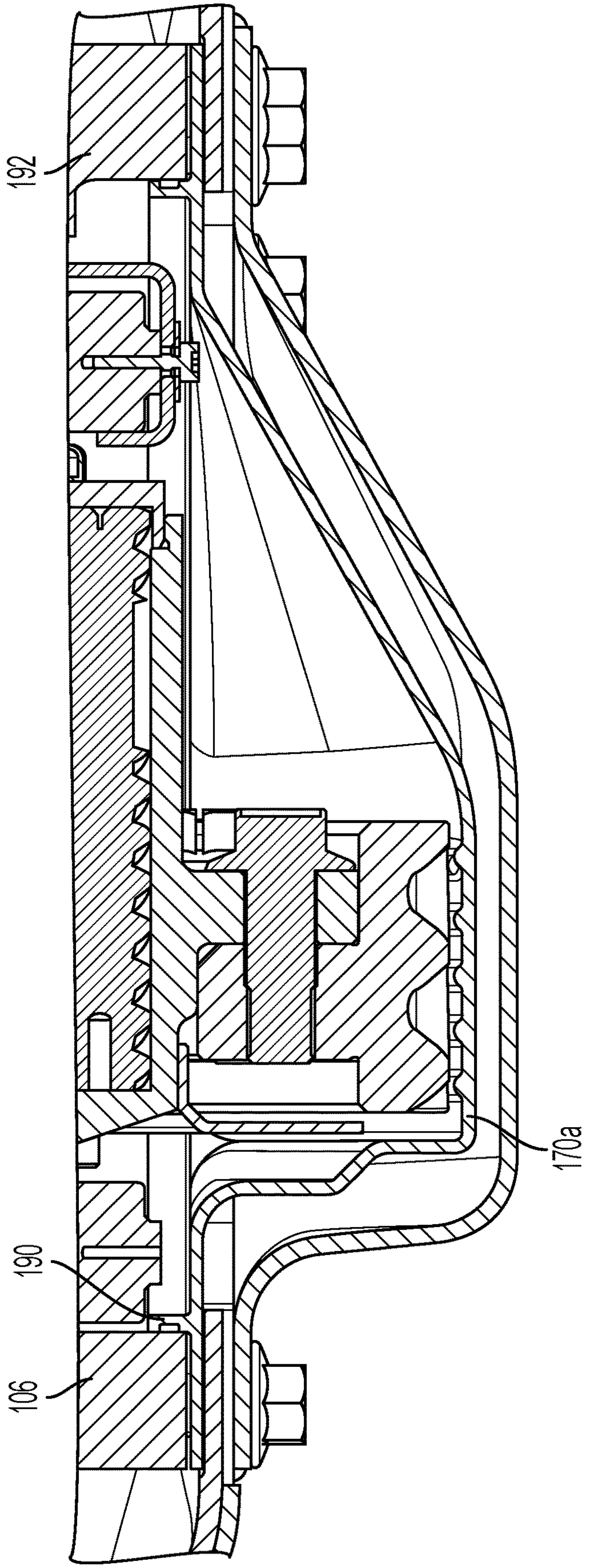
FIG. 12 is a cross-sectional view illustrating a first alternative cover sealing arrangement in accordance with the present disclosure.
Figure 13:
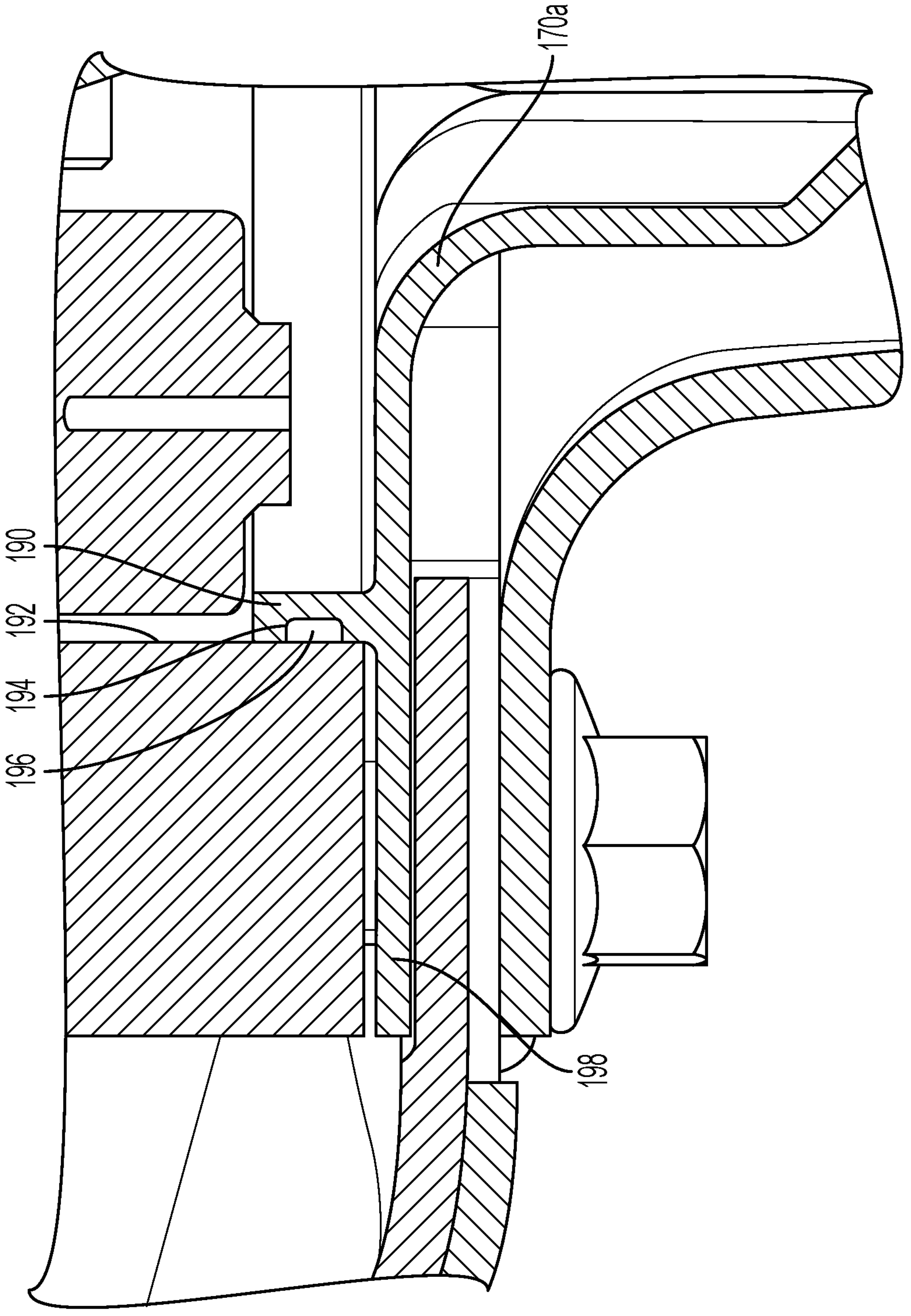
FIG. 13 is an enlarged portion of FIG. 12.

Turning to FIGS. 12 and 13, an alternative exemplary sealing arrangement for sealing a cover plate 170*a* to the housing 106 is illustrated. In this example, the separate flange sealing element 180 is omitted and the cover 170*a*, sometimes referred to as a sealing plate, includes a sealing flange 190 adapted to be received in the housing 106 for sealing against an inside surface 192 of the housing 106. The sealing flange 190 includes a groove 194 for receiving a seal element, such as an O-ring 196. The cover 170*a* includes a mounting flange 198 adapted to be interposed between the housing 106 and the banjo housing 104 and secured with bolts 132 and/or 178 as described above.

In this example, the sealing interface is an internal surface of the housing 106 (as compared to an end surface of the housing 106 in the case of flange sealing element 180). In certain applications, seal performance is enhanced in the sealing arrangement of FIGS. 12 and 13 because the sealing interface is not associated with a mounting interface between the housing 106 and the banjo housing 104. In addition, the mounting flange 194 maintains metal-to-metal contact around the entirety of the cover 170*a* with the housing 106 thus protecting against any leakage of electromagnetic interference.

Figure 14:
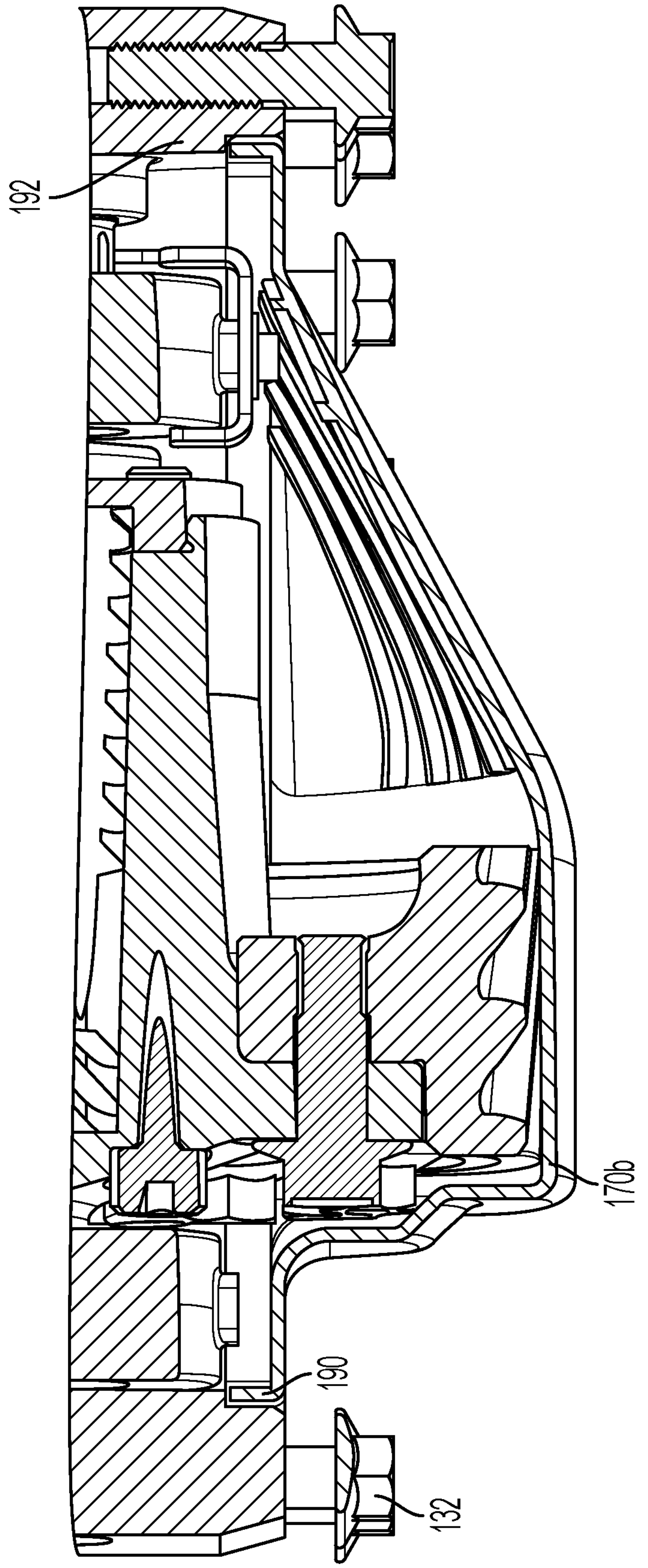
FIG. 14 is a cross-sectional view illustrating a second alternative cover sealing arrangement in accordance with the present disclosure.
Figure 16:
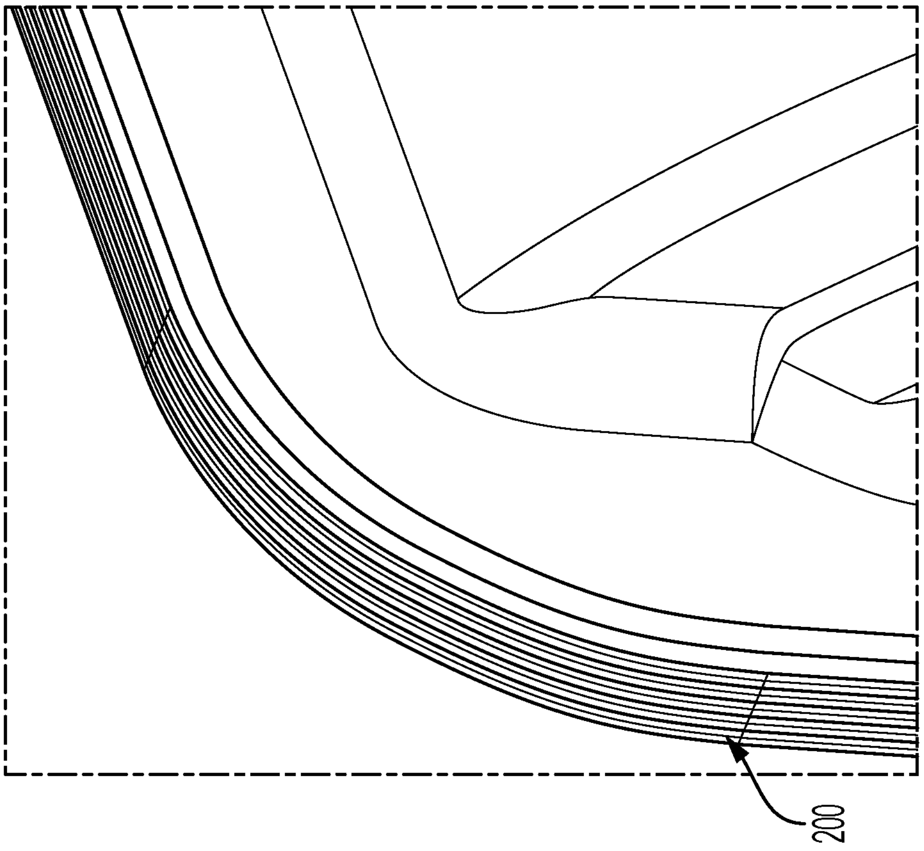
FIG. 16 is an enlarged portion of FIG. 15.
Figure 15:
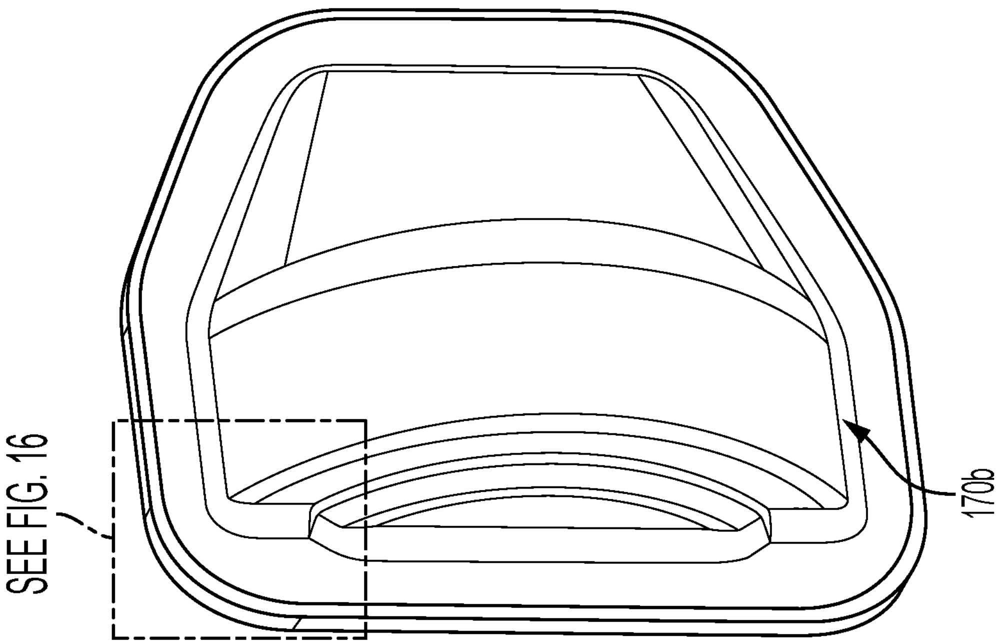
FIG. 15 is a perspective view of an exemplary cover in accordance with the present disclosure.

In FIGS. 14-16, another alternative exemplary sealing arrangement for sealing the cover 170*b* to the housing 106 is illustrated. In this example, the separate flange 174 is omitted and the cover 170*b* includes a sealing flange 190. The sealing flange 190 in this embodiment defines an outer perimeter of the cover 170*b* and is adapted to be received in the housing 106 for sealing against the inside surface 192 of the housing 106. The cover 170*b* is adapted to be press-fit into the housing 106. A seal element 200 is overmolded or otherwise bonded to the cover 170*b* about the periphery thereof including the sealing flange 190. In one example, the seal element 200 can include a high-compression ribbed-seal design. The cover 170*b* can be stamped or casted metal, such as steel or aluminum, or injection molded plastic. In this embodiment, the cover 170*b* is isolated from the connection interface between the housing 106 and the banjo housing 104. That is, the cover 170*b* is not exposed to any stresses that may be present at the connection interface between the housing 106 and the banjo housing 104.

Several advantages are achieved through employment of the embodiments disclosed herein including providing a durable and modular electrified axle assembly, thereby improving serviceability. Embodiments provide a durable assembly comprised of lighter materials such as aluminum that offers weight and cost savings.

Although the illustrated exemplary embodiments show the electric drive unit 102 extending forward from the banjo-type axle housing, it should be appreciated that in other embodiments the electric drive unit 102 (or other components) can be supported by the banjo-type axle housing and can extend in other directions such as rearward, upward, downward etc. without departing from the scope of the present disclosure.

It should also be appreciated that the electric drive unit 102 and axle shafts 151*a* and 151*b* comprise a fully sealed/contained eAxle assembly supported by the banjo-type axle housing. Accordingly, the electric drive unit 102 and axle shafts 151*a* and 151*b* can be installed and removed from the banjo-type axle housing while the banjo-type axle housing is installed to a vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

100 electric axle assembly
102 electric drive unit
104 axle housing
106 housing

108 electric motor
110 power electronics unit
112 gearbox
114 differential
116 banjo portion
118 hollow interior
120 back wall
122 carrier opening
124 portion (of housing 106)
126 carrier wall
129 differential components
130 side wall
132 first openings
134 bolts
136 holes
140 upper half member
142 lower half member
144 welds
146 welds
148 tube portion
150 tube portion
151*a* axle shaft
151*b* axle shaft
154 stiffening ring
158 flange
160 back cover
162 openings
163 openings
164 weld
170 cover plate
170*a* cover plate
170*b* cover plate
172 openings
174 flange
176 openings
178 bolts
180 sealing element
182 recessed portions
190 sealing flange
192 inside surface
194 groove
196 o-ring
198 mounting flange
200 seal

What is claimed is:

1. An electric axle assembly, comprising:

a banjo-type axle housing including:

an upper member;

a lower member fixed to the upper member; and an electric drive unit having a housing;

wherein the electric drive unit is mounted within the banjo-type axle housing and connected thereto;

wherein the banjo-type axle housing includes a central portion defining a hollow interior configured to receive a portion of the housing of the electric drive unit and two beam portions extending axially away from the central portion on opposite sides; and wherein the central portion includes a front wall on a first side thereof, the front wall defining a carrier opening extending to the hollow interior of the central portion, and a back wall on a second side opposite the first side, wherein at least a portion of the housing of the electric drive unit extends through the carrier opening and is received in the hollow interior of the central portion of the banjo-type axle housing.

2. The electric axle assembly of claim 1, wherein the electric drive unit includes a power electronics unit located at a front of the housing of the electric drive unit.

3. The electric axle assembly of claim 1, further comprising a stiffening plate fixed to the back wall of the central portion of the banjo-type axle housing, wherein the electric drive unit is secured to the banjo-type axle housing and stiffening plate via a bolted connection.

4. The electric axle assembly of claim 3, wherein the bolted connection includes a plurality of bolts inserted through the back wall from the second side of the central portion and receiving in corresponding holes of the housing of the electric drive unit.

5. The electric axle assembly of claim 4, further comprising a stiffening ring interposed between the front wall of the central portion and the housing of the electric drive unit.

6. The electric axle assembly of claim 4, wherein the housing of the electric drive unit includes an opening and a cover plate enclosing the opening.

7. The electric axle assembly of claim 6, wherein the cover plate includes a sealing flange adapted to be telescopically received in the opening of the housing, the sealing flange supporting a sealing element for sealing against an internal surface of the housing.

8. The electric axle assembly of claim 7, wherein the sealing element includes an O-ring supported in a groove in the sealing flange.

9. The electric axle assembly of claim 7, wherein the sealing element includes an overmolded seal on at least the sealing flange.

10. The electric axle assembly of claim 7, wherein the cover plate includes a peripheral mounting flange including a plurality of openings, and wherein the plurality of bolts extend through the openings in the peripheral mounting flange of the cover plate.

11. The electric axle assembly of claim 10, wherein the mounting flange is perpendicular to and extends outwardly from the sealing flange.

12. The electric axle assembly of claim 6, wherein the cover plate is press-fit into the opening of the housing.

13. The electric axle assembly of claim 1, wherein the upper and lower members are of a stamped construction.

14. The electric axle assembly of claim 1, further comprising first and second axle shafts coupled to the electric drive unit and supported by the banjo-type axle housing.

15. A method of assembling an electric axle assembly comprising:

providing a banjo-type axle housing having an opening on a first side and a hollow interior;

providing an electric drive unit having a housing;

inserting the electric drive unit through the opening so at least a portion of the housing is received in the hollow interior of the banjo-type axle housing; and securing the housing of the electric drive unit within the banjo-type axle housing with at least one fastener installed from a second side of the banjo-type housing opposite the first side;

wherein the banjo-type axle housing includes a central portion defining a hollow interior configured to receive a portion of the housing of the electric drive unit and two beam portions extending axially away from the central portion on opposite sides; and wherein the central portion includes a front wall on a first side thereof, the front wall defining a carrier opening extending to the hollow interior of the central portion, and a back wall on a second side opposite the first side, wherein at least a portion of the housing of the electric drive unit extends through the carrier opening and is received in the hollow interior of the central portion of the banjo-type axle housing.

16. The method of claim 15, wherein securing the housing of the electric drive unit within the banjo-type housing includes inserting a plurality of bolts through a rear wall of the banjo-type housing into threaded bores in the housing of the electric drive unit, and tightening the plurality of bolts.

* * * * *